United States Patent
Shimamura

(10) Patent No.: US 10,355,458 B2
(45) Date of Patent: Jul. 16, 2019

(54) PRODUCTION METHOD OF SPARK PLUG

(71) Applicant: NGK SPARK PLUG CO., LTD., Nagoya-shi, Aichi (JP)

(72) Inventor: Takuya Shimamura, Iwakura (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 0 days.

(21) Appl. No.: 16/161,469

(22) Filed: Oct. 16, 2018

(65) Prior Publication Data

US 2019/0123517 A1    Apr. 25, 2019

(30) Foreign Application Priority Data

Oct. 23, 2017  (JP) ................. 2017-204215

(51) Int. Cl.
  *H01T 21/02* (2006.01)
  *H01T 13/32* (2006.01)
  *G06T 7/00* (2017.01)
  *G06T 7/13* (2017.01)

(52) U.S. Cl.
  CPC ............ *H01T 21/02* (2013.01); *G06T 7/0004* (2013.01); *G06T 7/13* (2017.01); *H01T 13/32* (2013.01); *G06T 2207/30136* (2013.01)

(58) Field of Classification Search
  CPC ........... H01T 21/02; H01T 13/32; G06T 7/13; G06T 7/0004
  USPC ........................................................... 445/7
  See application file for complete search history.

(56) References Cited

U.S. PATENT DOCUMENTS

| | | | |
|---|---|---|---|
| 9,966,737 B1* | 5/2018 | Maki | H01T 13/58 |
| 2010/0320893 A1* | 12/2010 | Kato | H01T 13/32 |
| | | | 313/141 |
| 2011/0045731 A1* | 2/2011 | Musasa | H01T 13/467 |
| | | | 445/7 |
| 2013/0069516 A1* | 3/2013 | Sumoyama | C22C 5/04 |
| | | | 313/141 |
| 2013/0293087 A1* | 11/2013 | Sakayanagi | H01T 13/32 |
| | | | 313/141 |
| 2014/0159564 A1* | 6/2014 | Sumoyama | H01T 13/39 |
| | | | 313/141 |
| 2017/0141546 A1* | 5/2017 | Fujii | H01T 13/20 |

FOREIGN PATENT DOCUMENTS

| | | | |
|---|---|---|---|
| JP | 11121143 A | * | 4/1999 |
| JP | H11-121143 A | | 4/1999 |
| JP | 2000180309 A | * | 6/2000 |

* cited by examiner

*Primary Examiner* — Christopher M Raabe
(74) *Attorney, Agent, or Firm* — Kusner & Jaffe

(57) ABSTRACT

Disclosed is a production method of a spark plug in which a ground electrode has an electrode base and a tip welded to a surface of the electrode base via a weld metal. The production method includes an image capture step, an image analysis step and an inspection step. The image capture step is to capture image data about the surface of the electrode base to which the tip has been welded. The image analysis step is to perform analysis of the image data, thereby detecting an edge of the electrode base and an edge of the weld metal, determining a center point of a contour of the weld metal and then detecting an edge of the tip in a specific area of the image data. The inspection step is to inspect a welding position of the tip based on the detected edges of the electrode base and the tip.

6 Claims, 6 Drawing Sheets

PRODUCTION METHOD OF SPARK PLUG

FIELD OF THE INVENTION

The present invention relates to a method for producing a spark plug, particularly of the type having a ground electrode with a tip welded to an electrode base thereof.

BACKGROUND OF THE INVENTION

There is known a spark plug in which a ground electrode has a tip welded to an electrode base thereof for improvement in spark wear resistance. Japanese Laid-Open Patent Publication No. H11-121143 discloses a technique for inspecting this type of ground electrode, including the steps of: capturing image data about a surface of the electrode base to which the tip has been welded; detecting respective edges (i.e. boundaries of contrast changes) of the electrode base and the tip by analysis of the image data; and judging whether the welding position of the tip is proper (acceptable) or not based on the detected edge positions.

SUMMARY OF THE INVENTION

In the above-disclosed conventional inspection technique, however, a damage on the surface of the electrode base, an uneven spot on the weld metal or the like becomes a noise that causes a deterioration in the accuracy of detecting the edge of the tip. This leads to a deterioration in the accuracy of judging whether the welding position of the tip is proper or not.

The present invention has been made to address such a judgment accuracy deterioration problem. An advantage of the present invention is a method for producing a spark plug with improved accuracy of judgment on the welding position of a tip on a ground electrode.

In accordance with a first aspect of the present invention, there is provided a production method of a spark plug, the spark plug comprising a ground electrode that has an electrode base and a tip joined by welding to a surface of the electrode base with a weld metal formed around the tip, the production method comprising:

an image capture step of capturing image data about the surface of the electrode base to which the tip has been welded;

an image analysis step of analyzing the image data captured by the image capture step; and an inspection step of inspecting a welding position of the tip on the electrode base based on the image data analyzed by the image analysis step, wherein the image analysis step includes:

an electrode base detection step of detecting an edge of the electrode base;

a weld metal detection step of detecting an edge of the weld metal;

a center point determination step of determining a center point of a contour of the weld metal based on the edge of the weld metal detected by the weld metal detection step; and a tip detection step of detecting an edge of the tip in a first area of the image data, the first area being defined as an area inside a first imaginary line which is annular and centered on the center point, and wherein, in the inspection step, the welding position of the tip is judged as being in a predetermined acceptable range or not based on a position of the edge of the electrode base detected by the electrode base detection step and a position of the edge of the tip detected by the tip detection step.

There may occur a noise (due to a damage on the surface of the electrode base or the like) outside the first imaginary line. With the above configuration, however, the edge of the tip is detected without influenced by such a noise. As the welding position of the tip is inspected based on the detected edge of the tip, it is possible to improve the accuracy of judging whether the welding position of the tip is proper or not.

In accordance with a second aspect of the present invention, there is provided a production method of a spark plug as described above, wherein the image analysis step includes: a contour determination step of determining a temporary contour of the tip based on a known dimension of the tip before the welding such that the temporary contour of the tip is centered on the center point, and wherein the first imaginary line is located outside (outward of) the temporary contour of the tip.

With the above configuration, it is possible to further improve the accuracy of detecting the edge of the tip.

In accordance with a third aspect of the present invention, there is provided a production method of a spark plug as described above, wherein, in the tip detection step, the edge of the tip is detected in an overlap area of the first area and a second area of the image data, the second area being defined as an area outside a second imaginary line which is annular and centered on the center point at a location closer to the center point than the first imaginary line.

It is possible with the above configuration to, even when a noise (due to a damage on the surface of the tip or the like) occurs inside the second imaginary line, detect the edge of the tip without being influenced by such a noise and thereby further improve the accuracy of detecting the edge of the tip.

In accordance with a fourth aspect of the present invention, there is provided a production method of a spark plug as described above, wherein the image analysis step includes: a contour determination step of determining a temporary contour of the tip based on a known dimension of the tip before the welding such that the temporary contour of the tip is centered on the center point, and wherein the second imaginary line is located inside (inward of) the temporary contour of the tip.

With the above configuration, it is possible to further improve the accuracy of detecting the edge of the tip.

In accordance with a fifth aspect of the present invention, there is provided a production method of a spark plug as described above, wherein the image analysis step includes: a contour determination step of determining a temporary contour of the tip based on a known dimension of the tip before the welding such that the temporary contour of the tip is centered on the center point, wherein the tip detection step includes: detecting edge components of the image data, which represent the edge of the tip, in a plurality of regions divided around the center point; and arranging at least one temporary edge component, which represents a temporary edge of the tip, on the temporary contour of the tip in any of the regions in which no edge component is detected, and wherein, in the inspection step, the welding position of the tip is judged as being in the predetermined acceptable range or not based on the edge components detected by the tip detection step and the at least one temporary edge component arranged by the tip detection step.

With the above configuration, it is possible to ensure the accuracy of determining the welding position of the tip even when the detected edge components are unevenly distributed around the center point.

In accordance with a sixth aspect of the present invention, there is provided a production method of a spark plug as described above, wherein the number of the edge components detected by the tip detection step is two or less.

With the above configuration, the total number of the detected and temporary edge components used for determining the welding position of the tip in the inspection step is set to three or more so that is possible to further improve the accuracy of determining the welding position of the tip.

The other objects and features of the present invention will also become understood from the following description.

DETAILED DESCRIPTION OF INVENTION EMBODIMENTS

Hereinafter, a preferred embodiment of the present invention will be described below with reference to the drawings.

Figure 1:
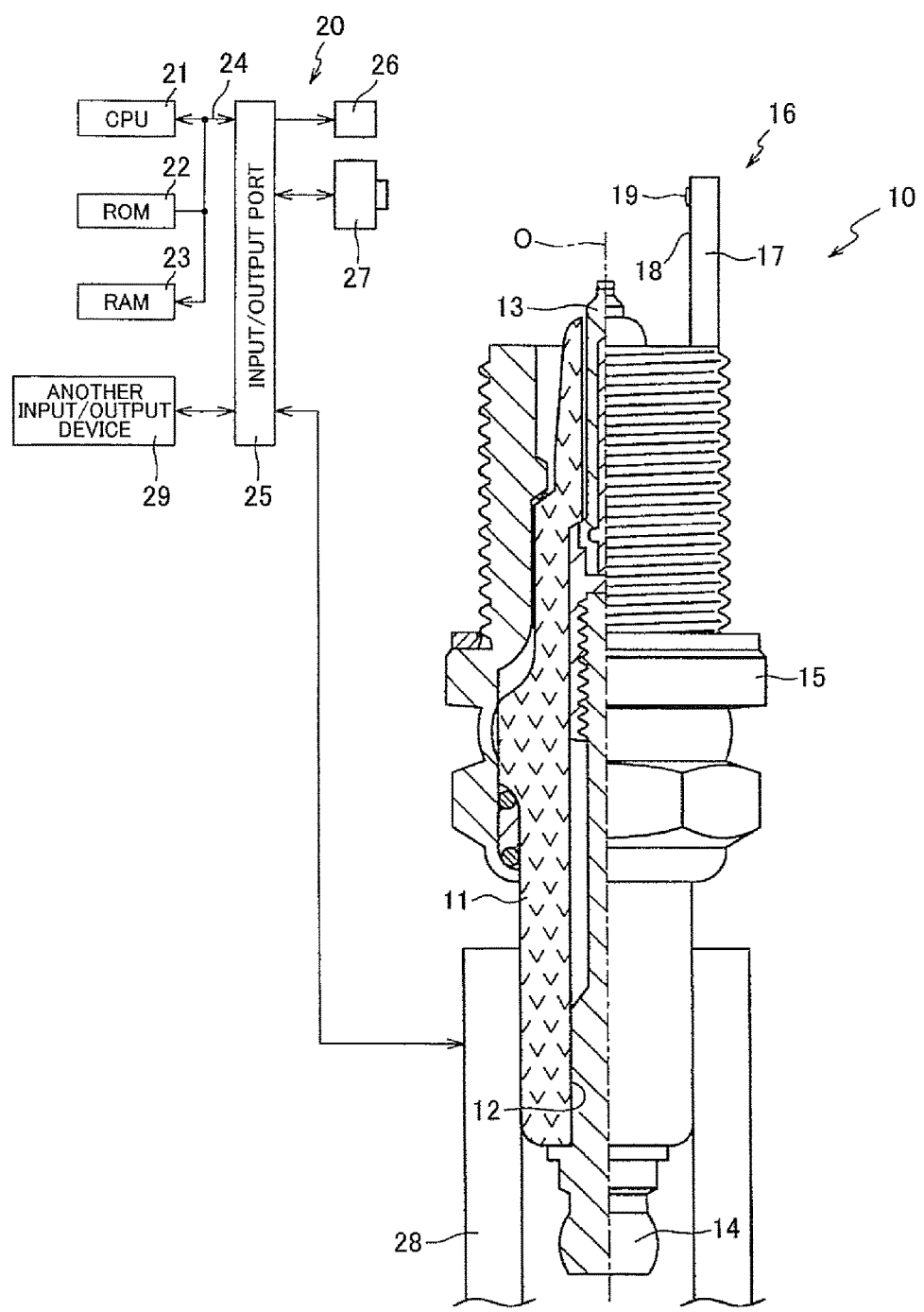
FIG. 1 is an electrical configuration diagram of an inspection apparatus for inspecting a ground electrode of a spark plug according to a first embodiment of the present invention.

FIG. 1 is an electrical configuration diagram of an inspection apparatus 20 for inspecting a ground electrode 16 of a spark plug 10 according to one embodiment of the present invention. In FIG. 1, one side of the spark plug 10 with respect to its axis O is shown in cross section. The lower and upper sides in FIG. 1 are referred to as front and rear sides of the spark plug 10, respectively.

As shown in FIG. 1, the spark plug 10 has an insulator 11, a center electrode 13 and the ground electrode 16.

The insulator 11 is substantially cylindrical-shaped and made of e.g. alumina having good mechanical properties and high-temperature insulating properties. An axial hole 12 is formed through the insulator 11 along the axis O.

The center electrode 13 is rod-shaped along the axis O. In the present embodiment, the center electrode 13 has a two-layer structure in which a core made of e.g. copper or copper-based alloy is covered by an outer layer made of e.g. nickel or nickel-based alloy. The center electrode 13 is held in a front side of the axial hole 12 of the insulator 11, with a front end of the center electrode 13 protruding from the axial hole 12.

A metal terminal 14 is made of a conductive metal material (such as low carbon steel) in a rod shape for connection to a high voltage cable (not shown). The metal terminal 14 is fixed to a rear end of the insulator 11 in a state where a front end part of the metal terminal 14 is inserted in a rear side of the axial hole 12 of the insulator 11.

A metal shell 15 is made of a conductive metal material (such as low carbon steel) in a substantially cylindrical shape and is fixed to an outer circumference of the insulator 11.

The ground electrode 16 is joined to a front end of the metal shell 15. The ground electrode 16 includes: a rod-shaped electrode base 17 made of a metal material (such as nickel-based alloy) and joined at one end portion thereof to the metal shell 15; and a tip 16 containing a noble metal and welded to a center electrode-facing surface 18 of the other end portion of the electrode base 17. A core made of e.g. copper or copper-based alloy may be embedded in the electrode base 17. The electrode base 17 of the ground electrode 16 is bent in shape so that a spark gap is defined between the tip 19 and the center electrode 13 in the spark plug 10. It should be noted that the state of the ground electrode 16 before bending of the electrode base 17 is illustrated in FIG. 1.

The above-structured spark plug 10 can be produced by, for example, the following method. First, the center electrode 13 is inserted in the axial hole 12 of the insulator 10 such that the front end of the center electrode 13 is exposed outside from the axial hole 12. Next, the metal terminal 14 is inserted in the axial hole 12 of the insulator 10. After the electrical connection between the metal terminal 14 and the center electrode 13 is established, the metal shell 15 to which the electrode base 17 in straight form has previously been joined is fitted around the insulator 10. The tip 19 is then welded to the center electrode-facing surface 18 of the electrode base 17. With this, the spark plug 10 is obtained in semifinished form. (The spark plug 10 in semifinished form is hereinafter occasionally referred to as "plug work"). Subsequently, the welding position of the tip 19 is inspected with the inspection apparatus 20. The plug work where the tip 19 is judged as being welded in a proper position to the electrode base 17 is brought to the subsequent bending process. In the bending process, the electrode base 17 is bent such that the tip 19 faces the front end of the center electrode 13 in the direction of the axis O. There is thus obtained the spark plug 10 in which the spark gas is defined between the tip 19 of the ground electrode 16 and the front end of the center electrode 13.

The inspection apparatus 20 is configured to capture image data of the center electrode-facing surface 18 of the electrode base 17 to which the tip 19 has been welded and inspect the welding position of the tip 19 based on the capture image data.

As shown in FIG. 1, the inspection apparatus 20 has a CPU 21, a ROM 22 and a RAM 23 connected to an input/output port 25 via a bus line 24. To the input/output port 24, various other devices including a lighting device 26, a camera 26, a transport device 28 and another input/output device 29 are also connected.

The CPU 21 is a processing unit that controls operations of the respective apparatus parts connected thereto by the bus line 24. The ROM 22 is a nonvolatile memory that unrewritably stores control programs executed by the CPU 21 (such as flowchart program shown in FIG. 3), fixed-value data and the like. The RAM 23 is a memory that rewritably stores various data during the execution of the control program.

The lighting device 26 is adapted to illuminate the electrode base 17 during the inspection.

The camera 27 is adapted to capture the image data of the electrode base 17. Although not specifically shown in the drawings, the camera 27 includes: an optical system for forming an image of the electrode base 17 and the tip 19 at a predetermined focal length position; an image pickup device such as CCD (charge coupled device) located at the focal length position to detect the image formed by the optical system; a memory for temporarily storing the image data detected by the image pickup device; and an output device for outputting the temporarily stored image data from the memory to the CPU 21. In the present embodiment, the image data is outputted, as gray scale data of 640×480 pixels (VGA), from the camera 27 to the CPU 21 and stored in the RAM 23.

The transport device 28 is adapted to hold the plug work (i.e. the spark plug 10 in semifinished form) at such a position that the camera 27 performs image pickup of the electrode base 17 and the tip 19 and to transport the plug work judged as a conforming product to the subsequent process or eject the plug work judged as a defective product.

The input/output device 29 includes an input device such as keyboard or mouse for inputting information and commands by an operator, a monitor for displaying various data such as the image captured by the camera 27, the number of plug works judged by the CPU 21 and the like.

Figure 2:
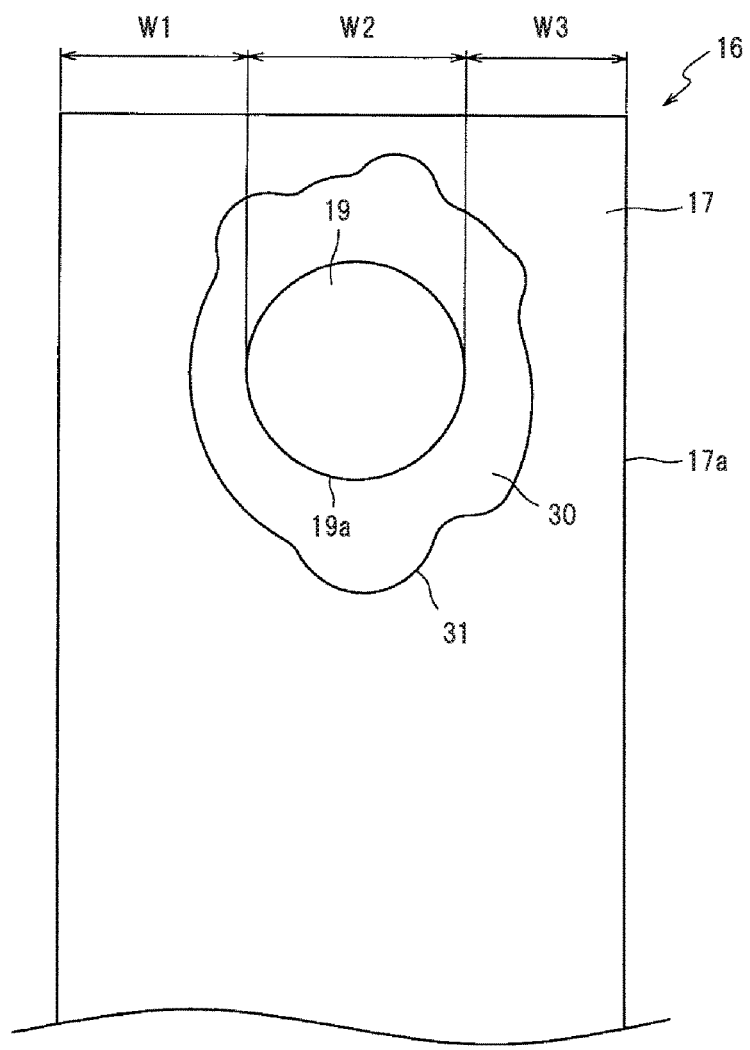
FIG. 2 is an elevation view of a part of an electrode base of the ground electrode to which a tip has been welded.

FIG. 2 is an elevation view of a part of the electrode base 17 of the ground electrode 16 to which the tip 19 has been welded. As shown in FIG. 2, the tip 19 is joined to the electrode base 17 by a weld metal 30 being formed around at least a part of the circumference of the tip 19. The weld metal 30 is a metal in which the materials of the electrode base 17 and the tip 19 are once melted and then solidified during the welding. Thus, the weld metal 30 consists of components of the materials of the electrode base 17 and the tip 19. In the present embodiment, the tip 19 is circular disk-shaped and resistance welded to the electrode base 17; and the weld metal 30 is formed around the entire circumference of the tip 19 by the resistance welding.

The resistance welding is done by placing the tip 19 on the center electrode-facing surface 18 of the electrode base 17, sandwiching the tip 19 and the electrode base 17 between electrodes (not shown) and resistance heating the contact parts of the tip 19 and the electrode base 17 with the passage of electric current between the electrodes. During the passage of electric current, the current density generally becomes high at an edge portion of the tip 19 among the contact parts of the tip 19 and the electrode base 17. Consequently, the temperature starts rising from the edge portion of the tip 19. As the melting spreads from the edge portion of the tip 19, the weld metal 30 (as a nugget) is formed around a contour 19a of the tip 19.

Figure 3:
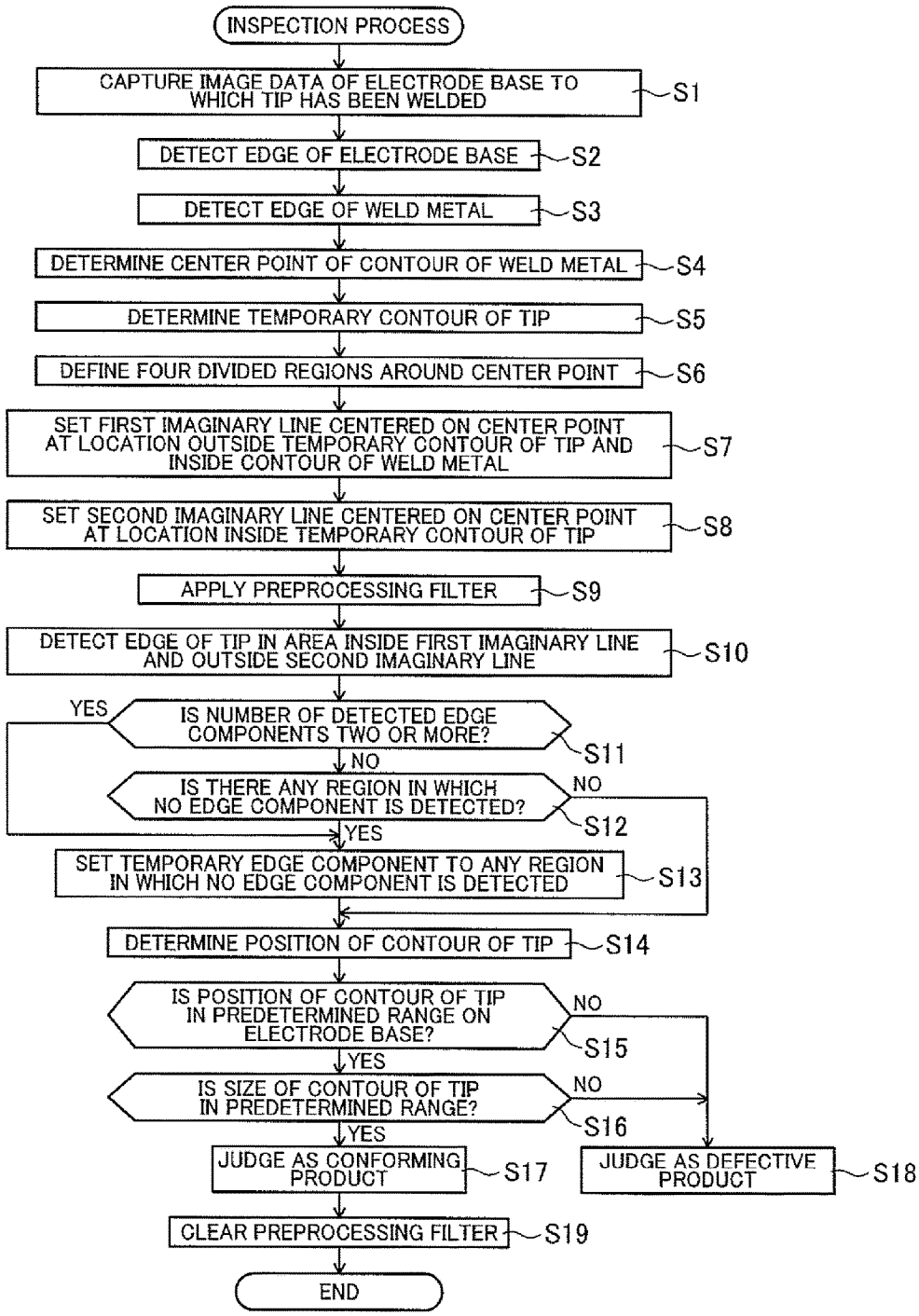
FIG. 3 is a flowchart of an inspection process executed by the inspection apparatus.

The inspection apparatus 20 captures the image data of the part of the center electrode-facing surface 18 of the electrode base 17 to which the tip 19 has been welded, detects the respective edges (i.e. boundaries of contrast changes) of the electrode tip 17 and the tip 19 by processing of the captured image data, and then, judges whether the welding position of the tip 19 is proper (acceptable) or not based on the detected edges. In the case where the captured image data contains a contrast change caused due to a damage on the center electrode facing surface 18 of the electrode base 17, an uneven spot on the weld metal 30 or the like rather than rather than the edge of the tip 19, however, such a contrast change becomes a noise that causes a deterioration in the accuracy of detecting the edge of the tip 19. For this reason, the inspection apparatus 20 executes inspection process on each plug work as shown in FIG. 3.

Figure 4:
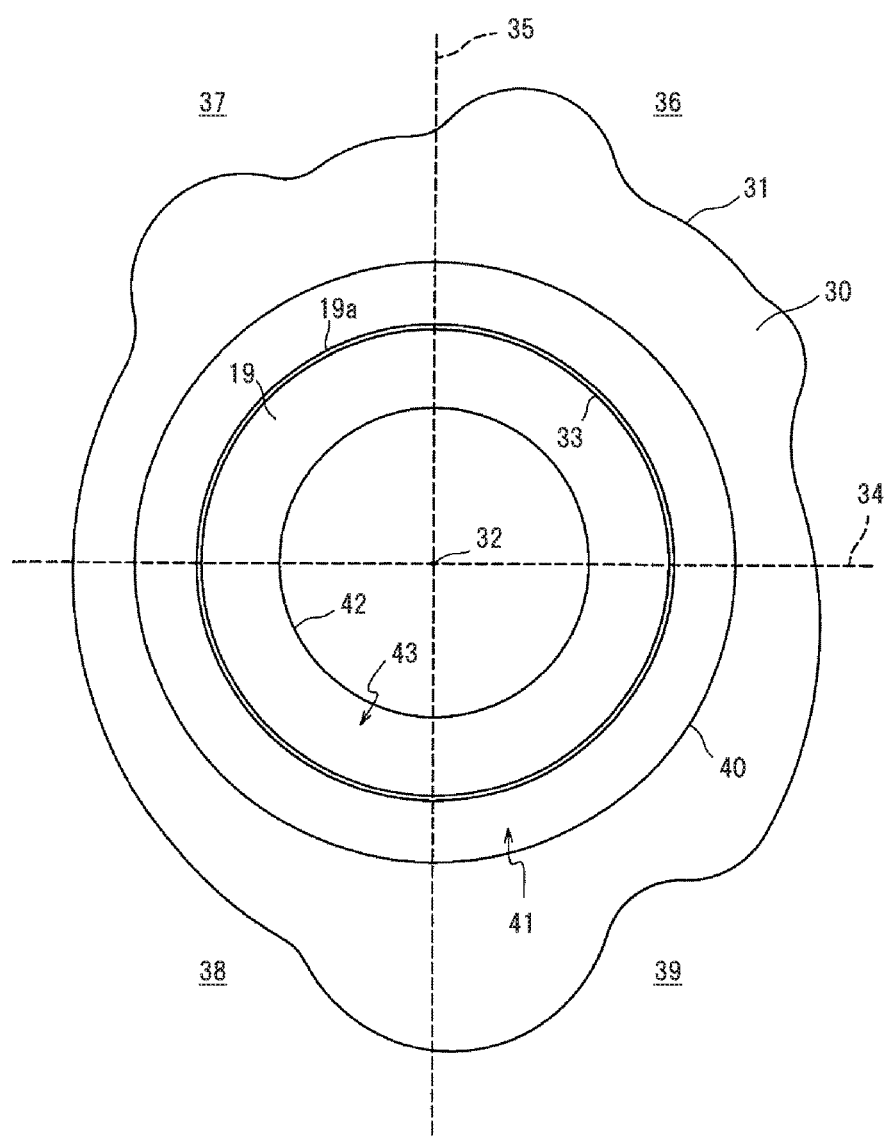
FIG. 4 is a schematic view showing an example of image data captured by the inspection apparatus.
Figure 5:
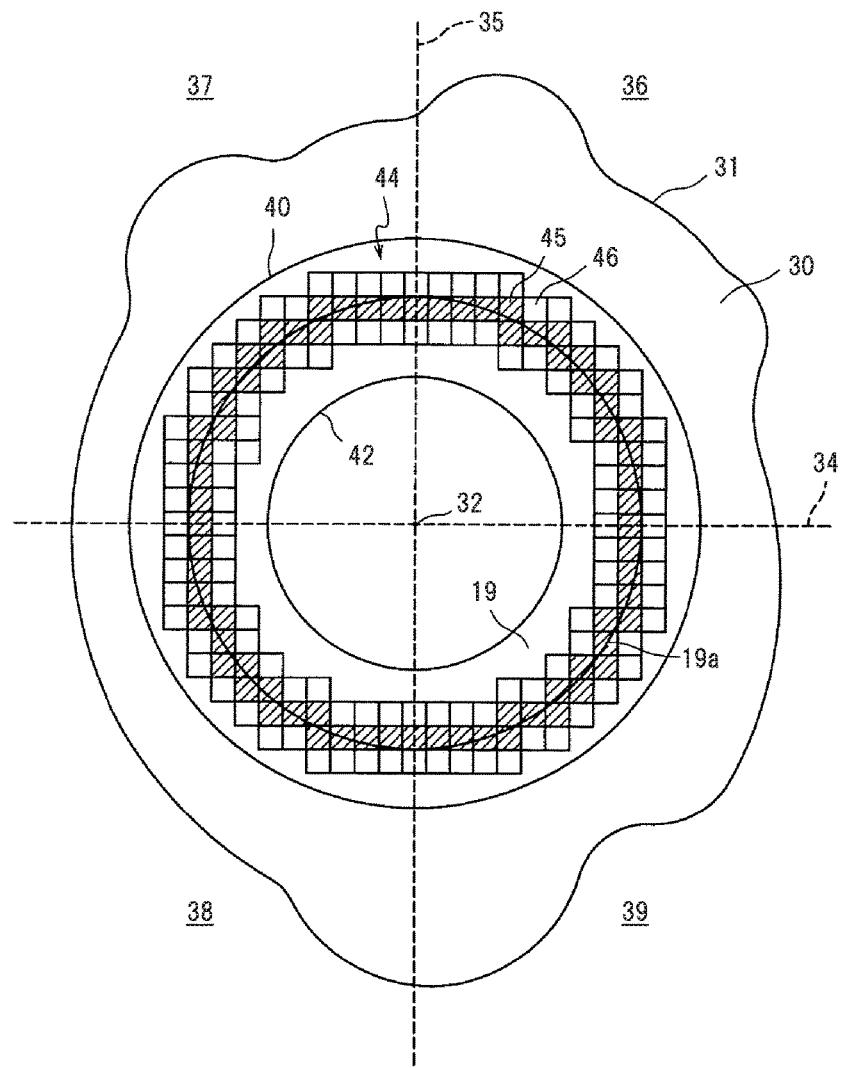
FIG. 5 is a schematic view showing an example of image data analyzed by the inspection apparatus.
Figure 6:
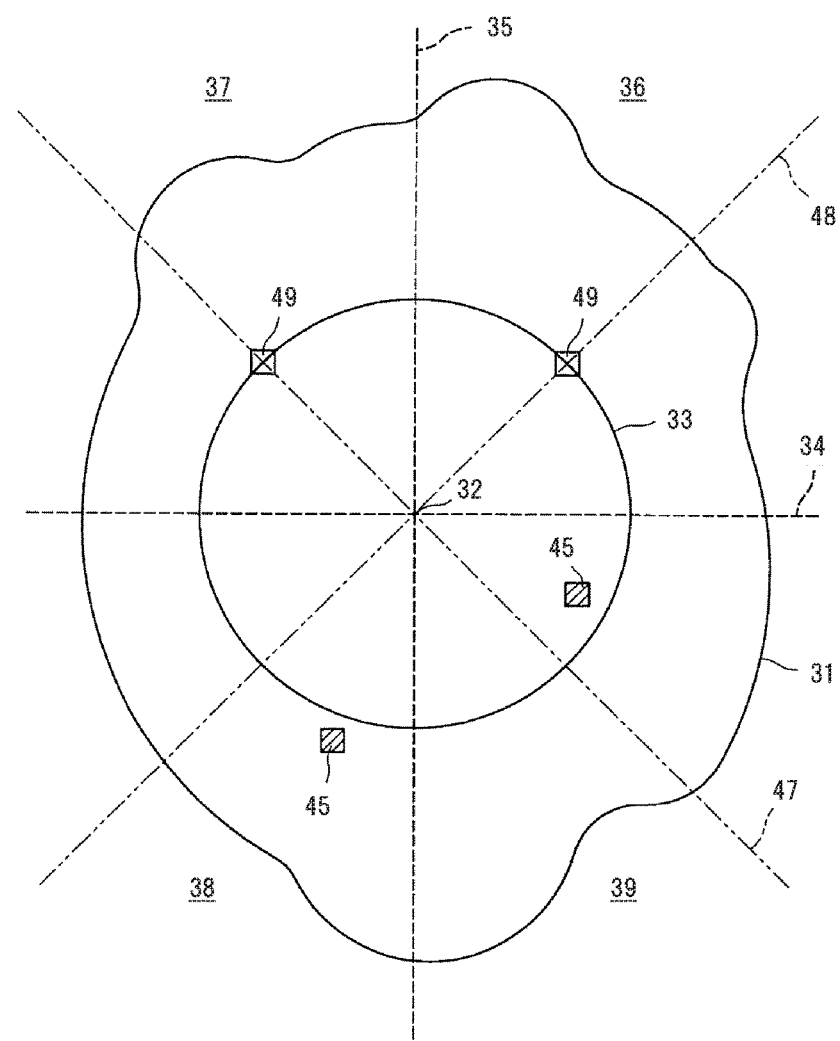
FIG. 6 is a schematic view showing an example of image data analyzed by the inspection apparatus.

The inspection process will be hereinafter explained below with reference to FIGS. 3 to 6. FIG. 3 is a flowchart for the inspection process executed by the inspection apparatus 20. FIGS. 4 to 6 are schematic views showing examples of the image data captured and processed by the inspection apparatus 20 during the execution of the inspection process.

Before the execution of the inspection process, known data about the shape and dimension of the tip 19 before the welding is inputted into the CPU 21 from another input device (input/output device 29) of the inspection apparatus 20. In the present embodiment, the shape (circular disk shape) and diameter of the tip 19 before the welding are inputted into the CPU 21. The inputted data about the shape and dimension of the tip 19 before the welding is stored in the RAM 23. Then, the CPU 21 initiates the inspection process.

At step S1, the CPU 21 operates the camera 27 to capture the image data of the center electrode-facing surface 18 of the electrode base 17 to which the tip 19 has been welded (see also FIG. 1).

At steps S2 and S3, the CPU 21 detects the edge of the contour 17a of the electrode base 17 and the edge of the contour 31 of the weld metal 30 (see FIG. 2) based on the captured image data. The respective edges of the electrode base 17 and the weld metal 30 can be detected by a known image processing technique such as projection processing, differential processing, subpixel processing etc. In the image, color and brightness suddenly change in the vicinity of the contour 17a of the electrode base 17 and in the vicinity of the contour 31 of the weld metal 30. The edges of the electrode base 17 and the weld metal 30 are thus detected with almost no influence of changes in color and brightness caused due to a damage on the electrode base 17, an uneven spot on the weld metal 30 and the like. Namely, it is possible to ensure the accuracy of detecting the edges of the electrode base 17 and the weld metal 30.

The CPU 21 then determines, based on the detected edge of the weld metal 30 (i.e. the contour 31 defined by a plurality of pixels), the position of the center 32 (as a center point C) of the contour 31 of the weld metal 30 at step S4. The processing of step S4 is performed by, assuming the contour 31 as a plane figure, determining the center of gravity of the plane figure as the center 32. The center of gravity can be determined by a known technique using arithmetic average of coordinates of the contour 31, moment of the plane figure, or the like.

At step S5, the CPU 21 determines the position of a temporary contour 33 of the tip 19 centered on the center 32 on the basis of the data stored in the RAM 23 about the shape and dimension of the tip 19 before the welding. In the present embodiment, the temporary contour 33 of the tip 19 is circular in shape because the tip 19 is circular disk-shaped before the welding. In FIG. 3, the actual contour 19a of the tip 19 after the welding is shown at nearly the same position as the temporary contour 33 of the tip 19 in view of the fact that, in general, the shape of the tip 19 does not almost change before and after the welding.

At step S6, the CPU 21 divides the image into a plurality of regions around the center 32. In the present embodiment, the CPU 21 sets first and second straight lines 34 and 35 passing through the center 32 and intersecting at right angles. More specifically, the first straight line 34 extends straight in parallel to a short side of the rectangular center electrode-facing surface 18 of the electrode base 17 and (i.e. in a direction perpendicular to the axis O in FIG. 1); and the second straight line 35 extends straight in parallel to a long side of the rectangular center electrode-facing surface 18 of the electrode base 17 and (i.e. in a direction parallel to the axis O in FIG. 1). By these straight lines 34, four first to fourth divided regions 36 to 38 are defined around the center 32.

At step S7, the CPU 21 sets a first imaginary line 40 which is annular and centered on the center 32 at a given location outside the temporary contour 33 of the tip 19 and inside the contour 31 of the weld metal 30. The first imaginary line 40 corresponds to the outer periphery of a first area 41 in which the edge of the tip 19 is to be detected. By this processing, the probability that the contour 19a of the tip 19 after the welding exists in the first area 41 is increased to improve the accuracy of detecting the edge of the tip 19. In the present embodiment, the first imaginary line 40 is circular in shape similar to the tip 19 because the tip 19 is circular disk-shaped before the welding.

At step S8, the CPU 21 sets a second imaginary line 42 which is annular and centered on the center 32 at a given location inside the temporary contour 33 of the tip 19. The second imaginary line 42 corresponds to the inner periphery of a second area 43 in which the edge of the tip 19 is to be detected. By this processing, the probability that the contour 19a of the tip 19 after the welding exists in the second area 43 is increased to improve the accuracy of detecting the edge of the tip 19. In the present embodiment, the second imaginary line 42 is also circular in shape similar to the tip 19 because the tip 19 is circular disk-shaped before the welding.

Herein, there is an overlap area 44 of the first area 41 (inside the first imaginary line 40) and the second area 43 (outside the second imaginary line 42) as shown in FIG. 5.

At step S9, the CPU 21 performs preprocessing on the overlap zone 44 with the application of a preprocessing filter. As the preprocessing filter, there can be used a known filter such as dilation filter, erosion filter, edge extraction filter, edge emphasis filter, differential filter, contrast conversion filter or the like. The preprocessing is performed on all of pixels in the overlap zone 44 in the present embodiment. The number of pixels in the overlap zone 44 is smaller than the number of all of pixels in the image data. Thus, the time required for the preprocessing in this step is shortened as compared to the case where the preprocessing is performed on all of pixels in the image data.

At step S10, the CPU 21 detects the edge of the tip 19 in the overlap zone 44. The edge of the tip 19 can be detected by a known image processing technique such as projection processing, differential processing, subpixel processing etc.

In the example of FIG. 5, data components (pixels) representing the edge of the tip 19 (referred to as edge components 45; indicated by hatching) exist in all of the first to fourth regions 36 to 39; and data components (pixels) not representing the edge of the tip 19 (referred to as non-edge components 46) exist adjacent to the edge components 45.

As the edge of the tip 19 is detected within the overlap zone 44 by the processing of step S10, a contrast change (as a noise) caused outside the overlap zone 44 due to e.g. a damage on the surface of the electrode base 17 or the tip 19 or an uneven spot on the weld metal 30 is prevented from interfering with detection of the edge of the tip 19. It is thus possible to improve the accuracy of detecting the edge of the tip 19. Furthermore, the edge of the tip 19 can be easily detected at step S10 as the preprocessing has been performed on the overlap zone 44 for contrast emphasis or noise removal at step S9 before step 10.

Subsequently, the CPU 21 judges at step S11 whether the number of the edge components 45 detected by the processing of step 10 is two or less.

When the number of the edge components 45 detected is three or more as shown in FIG. 5 (No at step S11), the equation of a circle corresponding to the contour 19a of the tip 19 can be determined by regression analysis of the edge components 45. For higher accuracy of regression analysis, however, the CPU 21 checks at step S12 whether or not there is any region in which no edge component 45 is detected.

When the edge components 45 are detected in all of the first to fourth regions 36 to 39 as shown in FIG. 5 (No at step S12), it is considered that the edge components 45 are evenly distributed around the center 32. The CPU 21 then proceeds to step S14. At step S14, the CPU 21 determines the position of the contour 19a of the tip 18 by regression analysis of the detected edge components 45.

When no edge component 45 is detected in any one or more of the first to fourth regions 36 to 39 (Yes at step S12), by contrast, the CPU 21 proceeds to step S13. As step S13, the CPU 21 arranges a temporary edge component 49, which represents a temporary edge of the tip 33, on the temporary contour 33 of the tip 19 in each region in which no edge component 45 is detected. It is herein assumed that no edge component 45 is detected in each of the first and second regions 36 and 37 as in the example of FIG. 6. In the present embodiment, the temporary edge components 49 are respectively arranged on a point of intersection between a bisecting line 47, which passes through the center 32 (center point C) and divides each of the second and fourth regions 37 and 39 into two equal parts, and the temporary contour 33 of the tip 19 and on a point of intersection between a bisecting line 48, which passes through the center 32 (center point C) and divides each of the first and third regions 36 and 38 into two equal parts, and the temporary contour 33 of the tip 19. The CPU 21 then determines the position of the contour 19a of the tip 18 by regression analysis of the detected edge components 45 and the temporary edge components 49 and at step S14.

By the processing of step S13, the temporary edge component 49 is arranged in each region in which no edge component 45 is detected. Namely, the data for the regression analysis exists in the respective first to fourth regions 36 to 39 so that uneven distribution of the data for the regression analysis is prevented to improve the accuracy of the regression analysis. It is thus possible to improve the accuracy of detecting the position of the contour 19a of the tip 19.

Further, the temporary edge components 49 are arranged on the bisecting lines 47, 48 of the regions 36, 37, that is, at the centers of the regions 36, 37 in which no edge component 45 is detected in the present embodiment. Uneven distribution of the temporary edge components 49 is thus prevented to suppress a deterioration in the accuracy of the regression analysis caused due to the arrangement of the temporary edge components 49. As one temporary edge component 49 is arranged in each region 36, 37 in which no edge component 45 is detected, the accuracy of determining the contour 19a of the tip 19 is prevented from being deteriorated due to the temporary edge components 49 which are dependent on the temporary contour 33 of the tip 19 before the welding.

When the number of the edge components 45 detected is two or less as shown in FIG. 6 (Yes at step S11), the CPU 21 skips the processing of step S12 and proceeds to step S13. At step S13, the CPU 21 arranges a temporary edge component 49 on the temporary contour 33 of the tip 19 in each region in which no edge component 45 is detected, whereby even when the number of the edge components 45 detected is two or less, the equation of a circle (corresponding to the contour 19a of the tip 19) can be determined by regression analysis of the detected edge components 45 and the temporary edge components 49. The CPU 21 hence determines the position of the contour 19a of the tip 18 by regression analysis of the detected edge components 45 and the temporary edge components 49 at step S14.

After that, the CPU 21 judges at step S15 whether the position of the contour 19a of the tip 19 is in a predetermined range on the electrode base 17. More specifically, the CPU 21 determines distances W1 and W3 from the contour 17a of the electrode base 17 to the contour 19a of the tip 19 in a width direction of the electrode base 17 (see FIG. 2) based on the edge of the electrode base 17 detected by the processing of step S2 and the contour 19a of the tip 19 determined by the processing of step S14, and then, judges whether the difference between the distances W1 and W3 is in a predetermined range.

When the position of the contour 19a of the tip 19 is not in the predetermined range (No at step S15), the welding position of the tip 19 is not proper. In this case, the CPU 21 determines the plug work as a defective product at step S18. The CPU 21 then clears the preprocessing filter at step 19 and exits the inspection process.

When the position of the contour 19a of the tip 19 is in the predetermined range (Yes at step S15), the welding position of the tip 19 is proper. In this case, the CPU 21 further judges at step S16 whether the size of the contour 19a of the tip 19 is in a predetermined range at step S16. More specifically, the CPU 21 judges whether the width W2 of the tip 19 (see FIG. 2) is in a predetermine range based on the contour 19a of the tip 19 determined by the processing of step S14 in the present embodiment.

When the size of the contour 19a of the tip 19 is not in the predetermined range (No at step S16), the melting amount of the tip 19 is excessive. In this case, the CPU 21 determines the plug work as a defective product at step S18. The CPU 21 then clears the preprocessing filter at step 19 and exits the inspection process.

When the size of the contour 19a of the tip 19 is in the predetermined range at step S16 (Yes at step S16), the melting amount of the tip 19 is proper. In this case, the CPU 21 determines the plug work as a conforming product at step S17. Then, the CPU 21 clears the preprocessing filter at step 19 and exits the inspection process.

The plug work judged as a conforming product is transported by the transport device 28 to the subsequent process.

As described above, it is possible in the present embodiment to accurately inspect the welding position of the tip 19 on the electrode base 17 of the ground electrode 19 by eliminating or reducing the influence of a noise due to a damage on the electrode base 17, an uneven spot on the weld metal 30 or the like. Since not only the welding position of the tip 19 but also the size of the contour 19a of the tip 19 (i.e. the melting amount of the tip 19) are inspected in the inspection process, it is also possible to check the occurrence or non-occurrence of a welding defect such as improper fusion due to excessive melting of the tip 19.

In the present embodiment, the processing of step S1 corresponds to an image capture step; the processing of steps S2 to S14 corresponds to an image analysis step; and the processing of steps S15 and S16 corresponds to an inspection step. Among the image analysis step, the processing of step S2 corresponds to an electrode tip detection step; the processing of step S3 corresponds to a weld metal detection step; the processing of step S4 corresponds to a center point determination step; the processing of step S5 corresponds to a contour determination step; and the processing of steps S10 to S14 corresponds to a tip detection step.

Although the present invention has been described with reference to the above embodiment, the above embodiment is intended to facilitate understanding of the present invention and is not intended to limit the present invention thereto. Various changes and modifications can be made to the above embodiment without departing from the scope of the present invention.

In the above embodiment, the spark plug 10 is produced by, after fitting the metal shell 15 to which the electrode base 17 has been joined around the insulator 10, welding the tip 19 to the electrode base 17 and inspecting the welding position of the tip 19. The present invention is however not limited to such a spark plug production method. The spark plug 10 can alternatively be produced by welding the tip 19 to the electrode base 17 which has been joined to the metal shell 15, inspecting the welding position of the tip 19 and then fitting the metal shell 15 around the insulator 11, or by welding the tip 19 to the electrode base 17, inspecting the welding position of the tip 19 and then joining the electrode base 17 to the metal shell 15. It is feasible to judge whether the welding position of the tip 19 is proper or not at any stage after the welding of the tip 19 to the electrode base 17 during the production of the spark plug 10.

Although the circular disk-shaped tip 19 is resistance welded to the electrode base 17 in the above embodiment, the present invention is not limited to such a tip configuration. The above-mentioned shape and welding method of the tip 19 are merely examples.

For instance, the tip 19 may alternatively be in polygonal outer shape (such as rectangular or square plate shape) when viewed from the center electrode-facing surface 18. In this case, however, it is preferable that the temporary contour 33 and the first and second imaginary lines 40 and 42 are each set a polygonal shape similar to the outer shape of the tip 19.

Further, the tip 19 may alternatively be joined by laser welding etc. to the electrode base 17. As long as the edge of the weld metal formed by the laser welding etc. is detected based on the image data captured by the camera 27, it is feasible to judge whether the welding position of the tip 19 is proper or not in the same manner as in the above embodiment.

In the above embodiment, the image data is captured by the camera 27 with the optical system and the image pickup device. The present invention is however not limited to such an image capture technique. For example, an optical distance sensor may alternatively be used to capture the image data as three-dimensional image data. The optical distance sensor may be of the type that emit laser light to the ground electrode 16 and detect reflected laser light by means of a semiconductor element. As another alternative, the image data can be captured with the use of a stereo camera capable of recognizing the position of a three-dimensional object by parallax information.

Although the shapes of the first and second imaginary lines 40 and 42 are similar to the outer shape of the tip 19 in the above embodiment, the shapes of the first and second imaginary lines 40 and 42 are not particularly limited. Each of the first and second imaginary lines 40 and 42 may alternatively be in any arbitrary shape not similar to the outer shape of the tip 19.

In the above embodiment, the image is divided into four regions 36 to 39 around the center 32. The number of regions into which the image is divided around the center 32 is not particularly limited and can be set as appropriate. It is however preferable that the image is divided into three or more regions so as to, after the arrangement of the temporary edge component 49 in any of the regions in which edge component 45 is detected, ensure the accuracy of determining the contour 19a of the tip 19 based on the detected edge components 45 and the temporary edge components 49.

In the above embodiment, the CPU 21 is configured to determine the temporary contour 33 of the tip 19 at step S5. However, the processing of step S5 may be omitted. In the case where the processing of step S5 is omitted, the CPU 21 can be configured to set the first imaginary line 40 inside the contour 31 of the weld metal 30 at step S7 and set the second imaginary line 42 inside the first imaginary line 40 at step S8. Even when the processing of step S5 is omitted, the edge of the tip 19 is detected in the first area 41 inside the first imaginary line 40 without being influenced by a noise (e.g. a damage on the surface of the electrode base 17) outside the first imaginary line 40.

Further, the CPU 21 is configured to set the second imaginary line 42 at step S8 in the above embodiment. The processing of step S8 may however be omitted. Even when the processing of step S8 is omitted, the edge of the tip 19 is detected in the first area 41 inside the first imaginary line 40 without being influenced by a noise (e.g. a damage on the surface of the electrode base 17) outside the first imaginary line 40.

Although the CPU 21 is configured to perform the preprocessing at step S9 in the above embodiment, the processing of step S9 may be omitted. Even when the processing of step S9 is omitted, the edge of the tip 19 is detected in the first area 41 inside the first imaginary line 40 without being influenced by a noise (e.g. a damage on the surface of the electrode base 17) outside the first imaginary line 40.

In the above embodiment, the CPU 21 is configured to judge at step S11 whether the number of the edge components 45 detected is two or less in view of the fact that at least three edge components 45 are required to calculate the equation of a circle corresponding to the contour 19a of the circular disk-shaped tip 19. The threshold number of the detected edge components 45 can be set as appropriate depending on the shape of the tip 19. In the case where the tip is rectangular or square plate-shaped, for example, it is preferable that the CPU 21 is configured to judge at step S11 whether the number of the edge components 45 detected is three or less.

In the above embodiment, the CPU 21 is configured to arrange one temporary edge component 49 on the bisecting line 47, 48 of the region in which no edge component 45 is detected at step S13. The processing of step S13 is however not limited to such temporary data arrangement processing. For example, the CPU 21 may alternatively be configured to arrange the temporary edge component 49 on an arbitrary dividing line which passes through the center 32 and divide the region into e.g. three or four equal parts or on the first straight line 34 or the second straight line 35. The number of temporary edge components 49 arranged in each region can be set as appropriate within the range that the processing results are not too largely influenced by the temporary edge component 49.

In the above embodiment, the CPU 21 is configured to judge whether the welding position of the tip 19 is proper or not at step S15 by checking whether the difference between the distances W1 and W3 from the contour 17a of the electrode base 17 to the contour 19a of the tip 19 is in the predetermined range. The processing of step S15 is however not limited to such judgment processing. The CPU 21 may alternatively be configured to determine the center point of the detected edge of the tip 19 and judge whether the welding position of the tip 19 is proper or not based on the positional relationship of the determined center point and the electrode base 19.

The entire contents of Japanese Patent Application No. 2017-204215 (filed on Oct. 23, 2017) are herein incorporated by reference. The scope of the invention is defined with reference to the following claims.

Having described the invention, the following is claimed:

1. A production method of a spark plug, the spark plug comprising a ground electrode that has an electrode base and a tip joined by welding to a surface of the electrode base with a weld metal formed around the tip, the production method comprising:
    an image capture step of capturing image data about the surface of the electrode base to which the tip has been welded;
    an image analysis step of analyzing the image data captured by the image capture step; and
    an inspection step of inspecting a welding position of the tip on the electrode base based on the image data analyzed by the image analysis step,
    wherein the image analysis step includes:
    an electrode base detection step of detecting an edge of the electrode base;
    a weld metal detection step of detecting an edge of the weld metal;
    a center point determination step of determining a center point of a contour of the weld metal based on the edge of the weld metal detected by the weld metal detection step; and
    a tip detection step of detecting an edge of the tip in a first area of the image data, the first area being defined as an area inside a first imaginary line which is annular and centered on the center point, and
    wherein, in the inspection step, the welding position of the tip is judged as being in a predetermined acceptable range or not based on a position of the edge of the electrode base detected by the electrode base detection step and a position of the edge of the tip detected by the tip detection step.

2. The production method of the spark plug according to claim 1,
    wherein the image analysis step includes: a contour determination step of determining a temporary contour of the tip based on a known dimension of the tip before the welding such that the temporary contour of the tip is centered on the center point, and
    wherein the first imaginary line is located outside the temporary contour of the tip.

3. The production method of the spark plug according to claim 1,
    wherein, in the tip detection step, the edge of the tip is detected in an overlap area of the first area and a second area of the image data, the second area being defined as an area outside a second imaginary line which is annular and centered on the center point at a location closer to the center point than the first imaginary line.

4. The production method of the spark plug according to claim 3,
    wherein the image analysis step includes: a contour determination step of determining a temporary contour of the tip based on a known dimension of the tip before the welding such that the temporary contour of the tip is centered on the center point, and
    wherein the second imaginary line is located inside the temporary contour of the tip.

5. The production method of the spark plug according to claim 1,
- wherein the image analysis step includes: a contour determination step of determining a temporary contour of the tip based on a known dimension of the tip before the welding such that the temporary contour of the tip is centered on the center point,
- wherein the tip detection step includes: detecting edge components of the image data, which represent the edge of the tip, in a plurality of regions divided around the center point; and arranging at least one temporary edge component, which represents a temporary edge of the tip, on the temporary contour of the tip in any of the regions in which no edge component is detected, and
- wherein, in the inspection step, the welding position of the tip is judged as being in the predetermined acceptable range or not based on the edge components detected by the tip detection step and the at least one temporary edge component arranged by the tip detection step.

6. The production method of the spark plug according to claim 5,
- wherein the number of the edge components detected by the tip detection step is two or less.

* * * * *